United States Patent Office 3,458,568
Patented July 29, 1969

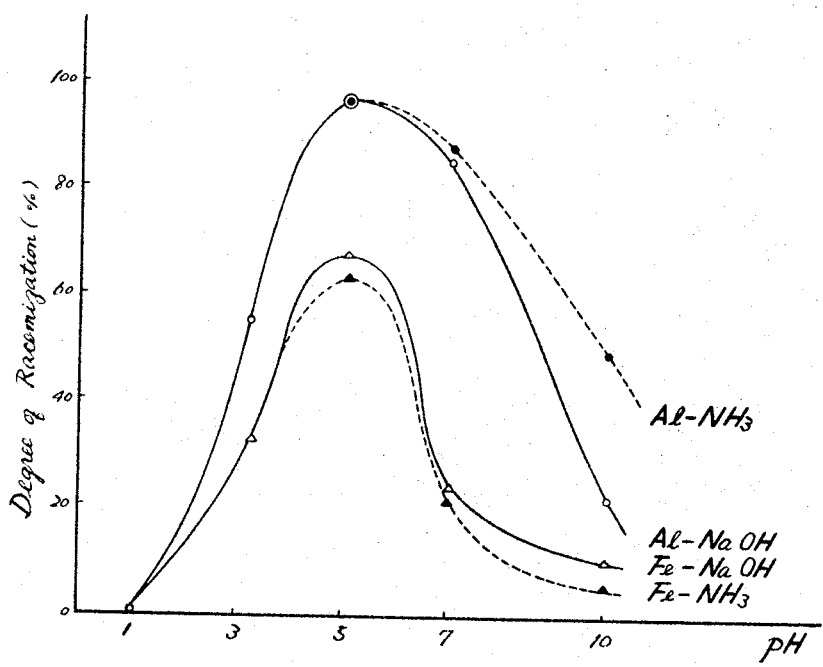

3,458,568
PROCESS FOR PREPARING AN OPTICALLY INACTIVE AMINO ACID FROM AN OPTICALLY ACTIVE AMINO ACID
Takahisa Ogasawara, Hidemaro Tatemichi, and Hiroo Ito, Nagoya-shi, and Shigenari Suzuki, Kasugai-shi, Japan, assignors to Toa Gosei Chemical Industry Co., Ltd., Tokyo, Japan, a corporation of Japan
Filed Feb. 14, 1966, Ser. No. 526,998
Claims priority, application Japan, Feb. 19, 1965, 40/9,123
Int. Cl. C07c 99/12
U.S. Cl. 260—534    5 Claims The present invention relates to a process for preparing an optically inactive amino acid from an optically active amino acid, and particularly to a process of preparing DL-glutamic acid from D-glutamic acid.

Generally, optically active amino acids have been obtained by resolving physically or biochemically the optically inactive amino acids or their derivatives which were produced by chemical synthesis processes. Among the optically active amino acids, only the L-isomers are useful for medicines and seasonings. Therefore, it is usual to isolate the L-isomer from the DL-amino acid and to yield the less useful D-isomer remaining as by-product. In these circumstances, it may lead to a great profit in the economy of the process if the by-product D-amino acid can be subjected to racemization so as to give the racemic modification from which the L-isomer may be recovered as a further crop.

Thus, it is known that an optically inactive amino acid obtained from a chemical, synthetic process is entirely or substantially entirely converted into the L-isomer by repeating the optical resolution and the subsequent racemization steps.

As to the method of racemizing an optically active amino acid, there may be mentioned a step in which the optically active amino acid is heated together with aqueous strong alkali or strong acid for a long period of time. With this step, however, it is generally difficult to rapidly convert all of the free amino acid into the racemic modification without operating at an elevated temperature and elevated pressure. Under these drastic conditions of racemization, some amino acids would partially or wholly be decomposed. In these circumstances, there have been developed several methods such as, for example, one in which an optically active amino acid is first converted to its proper derivative and this derivative is then subjected to racemization with alkali; and others in which the amino acid is first heated together with acetic anhydride or ketone etc., so as to form a racemic acetylamino acid which is then optically resolved in any way and hydrolysed. With these methods of the prior art, however, there are serious drawbacks in that the degree of racemization is low and that the isolation or recovery of the racemic amino acid from the reaction mixture is very difficult. Consequently, all the above-mentioned prior art methods of racemization cannot satisfactorily be utilised in the commercial application.

On the other hand, there is also another step in which the racemization of an optically active amino acid is accomplished under moderate conditions by using the enzyme racemase. In this enzymatic racemization, pyridoxal which is a coenzyme for said racemase plays a main role. It is known that an optically active amino acid may undergo the racemization at a pH of at least 10 in the presence of pyridoxal or a compound having the chemical structure analogous to that of pyridoxal, such as salicylaldehyde, 4-nitrosalicylaldehyde, o-aminobenzaldehyde and the like and in the co-existence of a metal ion which is capable of forming a chelate compound with said pyridoxal or its related compounds (refer to D. E. Metzler et al., "J. Am Chem. Soc., 76, 648 (1954)" and to Japanese Patent No. 295,110).

These racemization catalysts show their maximum activity when the pH in the aqueous reaction medium in which the racemization takes place is lying within a range of about 10–11, but the racemization does not substantially proceed even in the presence of these catalysts in case the pH is less than 10. Thus, when the above-mentioned catalysts are used in the racemization of an amino acid, it is required to introduce a large amount of alkali into the reaction medium in order to keep the pH at 10–11, and further to employ a large quantity of acid in order to neutralise the reaction mixture after the racemization was accomplished. Accordingly, a problem of large consumption of alkali and acid occurs in a commercial application of the prior art methods of racemization.

An object of the present invention is to provide a process by which a high yield of an optically inactive amino acid can be obtained from the racemization of an optically active amino acid while avoiding the above-mentioned drawbacks. A second object of the present invention is to provide a new catalyst system for the racemization of optically active amino acids. A third object of the present invention is to provide a process for the racemization of an optically active amino acid which may be operated within such a range of pH as cannot be expected from the prior art methods. In particular, further objects of the present invention are to provide a new process and catalyst system for the racemization of optically active glutamic acid.

The process of the present invention shows some marked advantages over the prior art methods in that the racemization of an optically active amino acid may proceed with minimum loss of the optically active amino acid and in that the catalyst system used according to the process of the present invention surprisingly can exhibit its high catalytic activity even in a lower range of pH than those required for the pyridoxal catalyst, so that the present invention is able to minimise the quantities of alkali and acid which are essentially consumed in the racemization step and the after-treatment step of the product mixture.

According to the present invention, a process for preparing an optically inactive amino acid from an optically active amino acid comprises subjecting the optically active amino acid or its water-soluble salt or derivative to racemization by heating its aqueous solution together with an alpha-ketocarboxylic acid or its water-soluble salt or derivative and a metal ion, and then isolating or recovering the resultant optically inactive amino acid in the form of the racemic modification from the reaction mixture.

According to a preferred embodiment of the present invention, an aqueous solution containing an optically active amino acid and an alpha-ketocarboxylic acid in an amount of 1 to 40% by weight based on the quantity of said amino acid is heated in the presence of a metal ion, and then the resultant optically inactive amino acid is isolated or recovered from the reaction solution.

In the following description of the present invention, the term "amino acid" and the term "alpha-ketocarboxylic acid" inclusively means their free acids, their water-soluble salts and their water-soluble derivatives, respectively.

According to the process of the present invention, both of an alpha-ketocarboxylic acid and a metal ion should be used as the components of the catalyst. The alpha-ketocarboxylic acid which may be used as the catalyst component in this invention includes pyruvic acid, phenylpyruvic acid, dimethylpyruvic acid, trimethylpyruvic acid, alpha-ketoglutaric acid, alpha-ketobutyric acid, 2-keto-valeric acid, 2-ketohexanoic acid, 3-methyl-2-ketovaleric acid, benzoylformic acid, 2-ketocaprylic acid, 2-ketocapric acid, 2-ketocaproic acid, 2-ketopelargonic acid, and their alkali metal salts, ammonium salts and their water-soluble derivatives such as, for example, pyruvic acid esters and amides and the like. However, these alpha-ketocarboxylic acids or their salts or derivatives should be soluble in water. While, it is unexpectable that the desired racemization of an optically active amino acid would proceed in case there is employed as the catalyst component such a keto-substituted carboxylic acid which bears the keto group at a position other than the alpha-position, for example, at the beta- or gamma-position, or in case there is employed other ketones.

When an optically alpha-active amino acid is subjected to the reaction of racemization according to the present invention, a part of the amino acid used can inevitably be converted into the corresponding alpha-ketocarboxylic acid as a result of the accompanying transamination slightly taking place between the amino acid and the alpha-ketocarboxylic acid present, and simultaneously a part of the alpha-ketocarboxylic acid used as the catalyst component according to the present invention also can be converted into the corresponding alpha-amino acid. Therefore, when an optically active alpha-amino acid is subjected to racemization according to the process of the present invention, it is desirable to employ as the catalyst component such an alpha-ketocarboxylic acid that the amino group of the alpha-amino acid to be racemized was replaced by the keto group. For instances, when optically active glutamic acid, alanine, valine, phenylalanine and isoleucine are subjected to racemization in the process of the present invention, it is desirable to select alpha-ketoglutaric acid, pyruvic acid, 2-ketoisovaleric acid, phenylpyruvic acid and 3-methyl-2-ketovaleric acid as the catalyst component, respectively.

If the combinations of the alpha-amino acid to be racemized and the alpha-ketocarboxylic acid used as the catalyst component as stated above are employed, the amino acid by-produced from said catalyst component as the consequence of the accompanying transamination is the same as the amino acid to be racemized in the process, so that the loss of the amino acid can be suppressed to minimum as a whole in the process of the invention.

The alpha-ketocarboxylic acid is a component of the catalyst used in the present invention and forms the catalyst system with the aforesaid metal ion. The rate or speed of racemization increases with increased amount of the alpha-ketocarboxylic acid added. It has been found that the rate of racemization is too small when the alpha-ketocarboxylic acid is present only in an amount of up to 1 mol. percent based on the quantity of the optically active amino acid to be racemized. In practice, therefore, it is preferred to add the alpha-ketocarboxylic acid in a proportion of higher than about 1 mol. percent based on the quantity of the optically active amino acid present.

In case the alpha-ketocarboxylic acid used as the catalyst component does not correspond to the amino acid to be racemized, it is preferred to use the alpha-ketocarboxylic acid in a proportion of 1–40 mol. percent based on the quantity of the optically active amino acid present. This is because the racemization reaction as well as the transamination reaction is enhanced with increased amount of the alpha-ketocarboxylic acid added, and because the transamination reaction takes place predominantly and irrelevantly for the purpose of the present invention when the proportion of the alpha-ketocarboxylic acid added is higher than 40 mol. percent on the quantity of the optically active amino acid present.

The metal ion which is to be added as the other catalyst component to the reaction system together with the aforesaid alpha-ketocarboxylic acid according to the present invention includes ions of aluminum, copper, chromium, bismuth and iron (III) etc. These metal ions may be added in the form of a water-soluble salt into the reaction system and this salt may generally be added in an amount of 10 to 100 mol. percent based on the quantity of the alpha-ketocarboxylic acid present in the reaction system.

In carrying out the process of the present invention, the catalyst system as stated above is added to an aqueous solution containing an optically active amino acid to be racemized, and this solution is then heated at a temperature of 50–110° C., preferably 80–90° C. and for a period of 10–400 minutes, preferably 60–120 minutes. If the reaction temperature used is too low, the rate of the racemization reaction will be too low for the practical operation. On the other hand, if the reaction temperature is too high, a part of the amino acid is then likely to undergo a cyclization due to the dehydration of the molecule and the alpha-ketocarboxylic acid also tends to decompose. Hence it is practical to employ a reaction temperature in the range of 50 to 110° C. in the process of the invention.

It has been noted that the catalyst system used according to the present invention exhibits its maximum activity when the pH in the reaction medium is within a range of 3 to 10 and particularly of 5 to 6. In order to adjust the pH of the reaction medium, it is possible to add a controlled amount of any of sodium hydroxide, potassium hydroxide, ammonium hydroxide and ammonia into the reaction medium. However, the addition of an organic base to the reaction medium is improper since it would hinder the desired racemization reaction.

The activity of the catalyst system used according to the present invention may be further enhanced by adding an amount of an organic solvent such as water-soluble alcohols into the reaction medium. The organic solvent which may be used for this purpose includes water-soluble saturated alcohols such as methanol, ethanol, propanol and ethylene glycol as well as formamide. However, the addition of higher alcohols is not suitable as it causes a separation of the reaction medium into two phases and/or a precipitation of the amino acid.

In case the reaction medium consists of water only, it has been found that the activity of the catalyst system used therein increases in the gradual sequence of cupric ion, ferric ion and aluminum (III) ion which is contained in the catalyst system. In contrast to this, when the reaction medium consists of a mixture of water and methanol or a mixture of water and ethanol, the activity of the catalyst system used increases in the gradual sequence of cupric ion, bismuth (III) ion, aluminum (III) ion and ferric ion.

As compared to the prior art methods, the process of the present invention is advantageous in that an optically active amino acid may readily be converted into the racemic modification with economic profit, because the process may be operated in a lower range of pH and because the operating conditions are not drastic so that the selection of material for the apparatus of carrying out the process may be easy.

The process of the present invention may be applied with advantage particularly to the racemization of optically active mono-sodium glutamate into the racemic modification. Thus, this mono-sodium salt in the form of the racemic modification shows a lower solubility in water than the salt in the optically active form, so that the racemic mono-sodium glutamate can preferentially precipitate from a saturated or super-saturated solution containing both the optically active salt and the racemic modification. In these circumstances, the racemic modification may preferentially crystallise, deposit on the bottom of the mother liquor and may easily be isolated from the mother liquor. While, glutamic acid or ammonium glutamate in the form of the racemic modification has a higher solubility in water than the optically active form. When the process of the present invention is applied to the racemization of glutamic acid or ammonium glutamate, it is required to re-adjust the pH of the reaction medium to 3.2 for the isolation of the resultant racemic modification. This re-adjustment of pH is an additional and troublesome step, as compared to when the process of the present invention is applied to the racemization of mono-sodium glutamate.

According to the process of the present invention, the racemization reaction is performed in an aqueous reaction medium as stated hereinbefore. The isolation or recovery of the amino acid in the form of the racemic modification from an aqueous reaction mixture may be accomplished by recovering an aqueous solution of the resultant optically inactive amino acid from said reaction mixture or by isolating crystals of the resultant optically inactive amino acid from said reactive mixture. The isolation of the resultant optically inactive amino acid in the form of crystals may be made either by adjusting the pH of the reaction mixture to the isoelectric point of the amino acid so as to deposit this or by adding a water-soluble alcohol to the reaction mixture and hence reducing the solubility of the amino acid so as to deposit this, or by concentrating the reaction mixture by evaporation so as to deposit the amino acid, or by a combination of two or some of these means. In addition, the isolation of the racemic modification may be carried out by treating the reaction mixture with an ion-exchange resin, thereby adsorbing the amino acid in the resin and eluting the amino acid therefrom with alkali or acid. The adsorption of an acidic amino acid, a neutral amino acid and a basic amino acid may be performed by treating the reaction mixture with a strongly basic anion-exchange resin or strongly acidic cation-exchange resin, with a strongly acidic cation-exchange resin or strongly basic anion-exchange resin and with a weakly or strongly acidic cation-exchange resin, respectively.

According to the process of the present invention, it is possible to perform the racemization of many optically active amino acids, including optically active alanine, glutamic acid, lysine, asparaginic acid, methionine, phenylalanine, valine, arginine and the like. According to the process of the invention, a D-amino acid which is less valuable for medicines and seasonings may be converted into the corresponding useful L-amino acid.

In the attached drawing, the figure shows a diagram which represents the relationship between the degree of racemization obtained and the pH of the reaction medium at which the process of the present invention is carried out in such a manner as mentioned in Example 7.

In the Examples, each isomer of the amino acids was quantitatively analysed by using infra-red absorption spectrum, Warburg's method and total amine acid analyser, respectively. The degree of racemization (percent) as given is defined by the following equation:

$$\text{Degree of racemization} = \frac{A° - B°}{A°} \times 100$$

wherein A° designates the angle of rotation of a liquid which has been prepared by diluting an aqueous solution of an optically active amino acid to be racemized with 4 N-hydrochloric acid to a volume of 5 times as much as the original volume of said aqueous solution; and B° stands for the angle of rotation of a liquid which has been prepared by diluting the racemized solution with 4 N-hydrochloric acid to a volume of 5 times as much as the original volume of the solution.

Example 1

1,000 grams of an aqueous solution containing 370 grams (1.98 mol.) of mono-sodium D-glutamate monohydrate, 29.2 grams (0.2 mol.) of alpha-ketoglutaric acid and 24.1 grams (0.1 mol.) of $AlCl_3 \cdot 6H_2O$ and having been adjusted to pH of 6.0 by addition of sodium hydroxide were heated at 80° C. for 60 minutes. After cooling, the angle of rotation of the solution was determined. Calculation showed that the degree of racemization was 78%. To this solution were added 208 grams of mono-sodium D-glutamate monohydrate. The solution was then kept at 80° C. for about 10 minutes with stirring, then slowly cooled to 30° C. and filtered. The crystals so obtained were washed once with 100 grams of water and then dried. The washing liquor was combined to the filtrate. Analysis of the resultant crystals of mono-sodium DL-glutamate dihydrate and of the filtrate gave the results as shown in Table 1.

TABLE 1

| Ingredients in analysed samples | Content, percent | |
| --- | --- | --- |
| | In crystals (weighing 500 grams) | In filtrate (weighing 938 grams) |
| Mono-sodium DL-glutamate dihydrate | 96.9 | (1) |
| Mono-sodium D-glutamate monohydrate | 2.3 | (2) |
| Alpha-ketoglutaric acid | 0.04 | 2.38 |
| Aluminum | 0.03 | 0.62 |

1 3.8 (as anhydrous crystal).
2 25.5 (as anhydrous crystal).

Example 2

An aqueous solution containing 14.6 grams (0.1 mol.) of alpha-ketoglutaric acid and 24.1 grams (0.1 mol.) of $AlCl_3 \cdot 6H_2O$ dissolved in 519 grams of water and having adjusted to pH of 6.0 by addition of sodium hydroxide was added with 751 grams of mono-sodium D-glutamate monohydrate to form a suspension. This suspension was subjected to the racemization reaction by heating at 80° C. with stirring.

In an initial stage of the reaction, the mono-sodium D-glutamate monohydrate remained as the crystals on the bottom of the mass of the suspension. It was observed that the D-glutamate was dissolved as the racemization reaction proceeded and that the resulting racemic modification was deposited in the form of granular crystals of mono-sodium DL-glutamate dihydrate. The crystals of the D-isomer had almost vanished in about the first 30 minutes of the reaction time, but the reaction was further continued at 80° C. When the reaction time was 80 minutes, that is, when the concentration of mono-sodium D-glutamate in the solution became 27%, the reaction was stopped. The reaction mixture was cooled down to 30° C. and filtered to yield the crude crystals.

These crystals were washed once with 157 grams of an aqueous solution of 16% of mono-sodium DL-glutamate and then dried. The washing liquor was combined to the filtrate, namely the mother liquor from which the crystals had been separated. The mother liquor was then again subjected to the racemization reaction in a similar way to the first process of the racemization. Analysis of the resultant crystals and of the secondly racemizated mother liquor gave the results as shown below.

TABLE 2

| Ingredients in analysed samples | Content, percent | |
| --- | --- | --- |
| | In crystals (weighing 534 grams) | In mother liquor (weighing 820 grams) |
| Mono-sodium DL-glutamate dihydrate | 93.1 | (1) |
| Mono-sodium D-glutamate monohydrate | 5.4 | (2) |
| Alpha-ketoglutaric acid | 0.045 | 1.03 |
| Aluminum | 0.013 | 0.30 |

1 13.6 (as anhydrous crystal).
2 29.3 (as anhydrous crystal).

Example 3

An aqueous solution (20 cc.) containing 1 mol. of L-glutamic acid and 9 grams of $AlCl_3 \cdot 6H_2O$ per liter of the solution and having been adjusted to a pH of 7.0 by addition of sodium hydroxide was added with pyruvic acid in an amount of 5 mol. percent based on the quantity of the L-glutamic acid which was present in the solution. The solution was heated in a sealed glass tube at 100° C. for 2 hours and then a part of the reaction mixture was withdrawn as an analysis sample. Determination of the angle of rotation of the diluted sample showed that the degree of racemization was 92%. 10 milliliters of the above reaction mixture were taken and adjusted to pH of 3.2 by addition of hydrochloric acid to yield 30.8 grams of the crystals which on analysis, were found to consist of DL-glutamic acid monohydrate.

Example 4

The procedure of Example 3 was repeated but using $FeCl_3 \cdot 6H_2O$ and $CuCl_2 \cdot 2H_2O$ in place of $AlCl_3 \cdot 6H_2O$, respectively. The degree of racemization obtained was 71% with the $FeCl_3 \cdot 6H_2O$ and 49% wtih the $CuCl_2 \cdot 2H_2O$.

Example 5

The procedure of Example 3 was repeated but by using methyl pyruvate instead of the pyruvic acid. The degree of racemization obtained amounted to 26%.

Example 6

Aqueous solution of L-glutamic acid and having been adjusted to pH's of 1, 3.2, 5, 7 and 10, respectively, by addition of hydrochloric acid or sodium hydroxide were prepared. To each of these solutions were added one of metal salts as tabulated below in such an amount that the concentration of the metal salt was 9 grams per liter of the aqueous solution of L-glutamic acid. 73 milligrams ($5 \times 10^{-4}$ mol.) of alpha-ketoglutaric acid were added to 10 ml. of the aqueous solutions of L-glutamic acid so prepared, and the mixture was heated at 100° C. for 2 hours. Determination of the angle of rotation showed that the degree of racemization was as tabulated below.

TABLE 3

| pH of glutamic acid solution | Concentration of glutamic acid (mol./l.) | Degree of racemization, percent | | |
|---|---|---|---|---|
| | | Metal salt added | | |
| | | $CuCl_2 \cdot 2H_2O$ | $AlCl_3 \cdot 6H_2O$ | $FeCl_3 \cdot 6H_2O$ |
| 1 | 1 | 0 | 0 | 0 |
| 3.2 | 0.25 | 20.1 | 13.9 | 2.1 |
| 5 | 0.5 | 67.5 | 90.2 | 40.9 |
| 7 | 1 | 18.9 | 79.0 | 19.6 |
| 10 | 1 | 3.2 | 8.3 | 5.1 |

Example 7

Aqueous solutions containing 1 gram/l. of $FeCl_3 \cdot 6H_2O$ or $AlCl_3 \cdot 6H_2O$ and 0.05 mol./l. of pyruvic acid as well as 1 mol./l. of L-glutamic acid at pH of 1, 0.25 mol./l. of L-glutamic acid at pH of 3, 0.5 mol./l. of L-glutamic acid at pH of 5, 1 mol./l. of L-glutamic acid at pH of 7 and 1 mol./l. of L-glutamic acid at pH of 10, respectively were prepared, the adjustment of the pH of each solution to a range of 5–10 being made by addition of sodium hydroxide or ammonia. 10 milliliters of each solution were heated in a sealed glass tube at 100° C. for 2 hours. After the reaction had been completed, the degree of racemization was estimated by determining the angle of rotation of the solutions. The results of estimation are plotted in the diagram as shown in the figure of the attached drawing. As will be seen from the diagram, it was observed that the reaction of racemization proceeded to a great extent in a region of pH of from 3 to 11, and particularly to a maximum extent in a region of pH of from 4 to 8.

Example 8

Aqueous solutions containing 0.05 mol./l. of $AlCl_3 \cdot 6H_2O$ and 1 mol./l. of L-lysine, 1 mol./l. of L-asparaginic acid, 1 mol./l. of L-alanine and 0.5 mol./l. of L-methionine respectively were prepared. The pH of each solution was adjusted to 5.5. 70 milliliters of each of these solution was added with pyruvic acid or alpha-ketoglutaric acid, respectively, in an amount of 10 or 20 mol. percent based on the quantity of the amino acid present in the solution and then heated in a sealed glass tube at 100° C. for 6 hours. Thereafter, the angle of rotation of the solutions was determined to estimate the degree of racemization of the above-mentioned amino acids. Thereafter, the isolation of each of racemized amino acids from the aqueous reaction mixture was performed. The results obtained are shown below.

TABLE 4

| Experiment No.: | Combination of optically active amino acid and alpha-keto-carboxylic acid used | Molar percent of amount alpha-keto-carboxylic acid added | Degree of racemization of optically active amino acid, percent | Yield of racemic amino acid, percent |
|---|---|---|---|---|
| 1 | L-alanine and alpha-ketoglutaric acid | 10 | 55.4 | 45.1 |
| 2 | do | 10 | 67.5 | 67.1 |
| 3 | L-asparaginic acid and alpha-ketoglutaric acid | 10 | 62.2 | 44.3 |
| 4 | L-asparaginic acid and pyruvic acid | 10 | 45.2 | 38.7 |
| 5 | L-lysine and alpha-ketoglutaric acid | 10 | 7.5 | |
| 6 | L-lysine and pyruvic acid | 10 | 17.2 | |
| 7 | L-methionine and alpha-ketoglutaric acid | 20 | 61.1 | 29.8 |
| 8 | L-methionine and pyruvic acid | 20 | 65.6 | 47.3 |

$$\text{Yield of racemic amino acid} = \frac{\text{(Net quantity of racemic amino acid recovered in crystals)}}{\text{(Amount of optically active amino acid initially fed)}} \times 100$$

In Experiment Nos. 1 and 2, the isolation of the racemized or racemic amino acids was carried out by adjusting 30 ml. of the reaction product mixture to a pH of 6, then concentrating this to 8 ml. under reduced pressure, adding 20 ml. of methanol to the residue and subsequently removing the resulting crystals by filtration. In Experiment Nos. 3 and 4, the isolation of the racemic amino acids was made by adjusting 30 ml. of the reaction product mixture of a pH of 2.8 and then treating this in the same way as in Experiment No. 1. In Experiments Nos. 7 and 8, the isolation of the racemic amino acids was also made by adjusting 30 ml. of the reaction product mixture to a pH of 5.7 and then treating this in the same manner as in Experiment No. 1.

Example 9

Aqueous solutions containing 1.0 mol./l. of L-glutamic acid, 5 grams/l. of $AlCl_3 \cdot 6H_2O$ and various proportions of different organic solvents were prepared, adjusted to a pH of 7.0 by addition of sodium hydroxide and then added with pyruvic acid in an amount of 5 mol. percent based on the quantity of the L-glutamic acid present in the solution. Each of these solutions was subjected to racemization reaction at 80° C. and the degree of racemization was estimated 2 hours and 4 hours after the start of the reaction. The results obtained are tabulated below.

TABLE 5

| Composition of the reaction medium (by volume) | Degree of racemization, percent After the start of reaction | |
|---|---|---|
| | 2 hours | 4 hours |
| 0 part of methanol plus 100 parts of water | 28 | 49 |
| 20 parts of methanol plus 80 parts of water | 82 | 94 |
| 40 parts of methanol plus 60 parts of water | 87 | 96 |
| 20 parts of ethanol plus 80 parts of water | 76 | 96 |
| 40 parts of propanol plus 60 parts of water | 70 | 91 |
| 40 parts of ethylene glycol plus 60 parts of water | 50 | 76 |
| 40 parts of formamide plus 60 parts of water | 7.3 | 93 |

Example 10

Aqueous solutions containing 1 mol./l. of L-glutamic acid and 9 grams/l. of a metal salt as indicated below and having been adjusted to a pH of 7 by addition of sodium hydroxide were prepared and added with pyruvic acid in an amount of 5 mol. percent based on the quantity of the glutamic acid. 10 milliliters of each of these solutions were heated in a sealed glass tube at 70° C. and 50° C. for 2 hours respectively. Thereafter, the angle of rotation of the solutions was determined to estimate the degree of racemization. The results obtained are tabulated below.

TABLE 6

| Metal salt used | Degree of racemization, percent | |
|---|---|---|
| | Reaction at 70° C. | Reaction at 50° C. |
| $CuCl_2 \cdot 2H_2O$ | 12 | 4 |
| $FeCl_3 \cdot 6H_2O$ | 58 | 30 |
| $AlCl_3 \cdot 6H_2O$ | 42 | 15 |

Example 11

Aqueous solutions containing 1 mol./l. of L-glutamic acid, 5 grams/l. of $AlCl_3 \cdot 6H_2O$ and 3 ml./l. of pyruvic acid and having been adjusted to pH of 7 by addition of sodium hydroxide and ammonium hydroxide, respectively were prepare and then subjected to racemization by heating at 80° C. for a period of time. During this reaction period, the reaction mixture was analysed at intervals of time so as to determine the remaining amount of pyruvic acid and the amount of alpha-ketoglutaric acid formed in the reaction mixture as well as the angle of rotation of the reaction mixture. From the resulting analytical data, there were calculated the degree of racemization of L-glutamic acid, the molar percentages of the remaining amount of pyruvic acid and the molar percentages of the existing amount of alpha-ketoglutaric acid on the basis of the initial quantity of pyruvic acid fed in said aqueous solutions. The amount of alpha-ketoglutaric acid was formed in the reaction mixture as the result of the transamination slightly taking place between the L-glutamic acid and pyruvic acid.

In this example, it is to be noted that the reaction of racemization was catalysed by the pyruvic acid in the earlier half of the reaction period but by the formed alpha-ketoglutaric acid in the later half of the reaction period.

The results obtained are tabulated below.

TABLE 7

| | NaOH pH-adjuster | | | NH₄OH pH-adjuster | | |
|---|---|---|---|---|---|---|
| Racemization time (in hr.) | Degree of racemization of L-glutamic acid, percent | Molar percent of remaining amount of pyruvic acid | Molar percent of existing amount of alpha-keto-glutaric acid | Degree of racemization of L-glutamic acid, percent | Molar percent of remaining amount of pyruvic acid | Molar percent of existing amount of alpha-keto-glutaric acid |
| 1 | 51 | 26 | 62 | 63 | 18 | 62 |
| 2 | 66 | 16 | 76 | 74 | 11 | 69 |
| 4 | 76 | 13 | 79 | 83 | 9 | 72 |
| 6 | 84 | 12 | 81 | 88 | 9 | 73 |
| 8 | 88 | 12 | 82 | 91 | 9 | 74 |
| 10 | 92 | 11 | 83 | 93 | 9 | 75 |
| 14 | 95 | 11 | ,83 | 95 | 8 | 75 |

Comparative Example 1

In this example, the catalytical activity of beta- and gamma-keto-carboxylic acids which are not used according to the present invention was tested for the racemization of an optically active amino acid.

The procedure of Example 4 was repeated but using sodium acetoacetate, methyl acetoacetate and levulinic acid instead of the alpha-ketoglutaric acid. In all the cases, it was observed that the reduction in the angle of rotation of the reaction mixture was only up to 5%. This means that the reaction of racemization did not substantially proceed.

Comparative Example 2

In this example, the catalytical activity of ketones other than the alpha-ketocarboxylic acids used according to the present invention was tested for the racemization of an optically active amino acid.

The procedure of Example 4 was repeated but using in place of the alpha-ketoglutaric acid; acetylacetone, benzoylacetone, dibenzoyl methane, 4-nitroacetyl acetone, trifluoroacetyl acetone, alpha-pyrrolidone, diacetone alcohol, benzalacetone, methyl vinyl ketone, diphenyl ketone, acetophenone, cyclohexanone, methyl ethyl ketone and acetone: In all the cases, it was observed that the reaction of racemization did not substantially take place. While there has been described in connection with preferred em-

What we claim is:

1. A process of racemizing an optically active amino acid selected from the group consisting of glutamic acid, alanine, lysine, asparaginic acid, methionine, phenyl alanine, valine and arginine and salts thereof, which comprises adding to an aqueous solution of said optically active amino acid a compound selected from the group consisting of alpha-ketocarboxylic acids and water-soluble salts thereof as well as a water-soluble compound of a metal selected from the group consisting of aluminum, iron, copper, chromium and bismuth in such amounts that the proportion of the alpha-ketocarboxylic acid added is 0.01 to 0.4 mol. per mol. of the optically active amino acid in the solution and that the proportion of the water-soluble compound of metal is 0.1 to 1 mol. per mol. of the alpha-ketocarboxylic acid added; and heating the solution at a temperature of 50 to 100° C. for a period of time of 10 to 400 minutes while the pH of the reaction mixture is kept within a range of 3 to 10.

2. A process as claimed in claim 1, in which the optically active amino acid used in glutamic acid and the alpha-ketocarboxylic acid used is alpha-ketoglutaric acid.

3. A process as claimed in claim 1, in which the optically active amino acid used is mono-sodium glutamate and the alpha-ketocarboxylic acid used is alpha-ketoglutaric acid.

4. A process as claimed in claim 1, in which the optically active amino acid used is alanine and the alpha-ketocarboxylic acid used is pyruvic acid.

5. A process as claimed in claim 1, in which the racemizing reaction is carried out in the presence of a compound selected from the group consisting of methanol, ethanol, propanol, ethylene glycol and formamide.

References Cited

UNITED STATES PATENTS

| | | | |
|---|---|---|---|
| 2,071,327 | 2/1937 | Bley | 260—534 XR |
| 3,213,106 | 10/1065 | Sasaji et al. | 260—534 XR |
| 3,297,637 | 1/1967 | Akabori et al. | 260—534 XR |

OTHER REFERENCES

Akabori et al.: Chem. Ab., vol. 62: 13338–13339 (1965).

Metzler et al.: J. Am. Chem. Soc., vol. 76, pp. 648–652 (1954).

Nakada et al.: J. Biol. Chem., vol. 204, pp. 831–836 (1953).

Olivard et al.: J. Biol. Chem., vol. 199, pp. 669–674 (1952).

Mix: Z. Physiol. Chem., vol. 315, pp. 1–12 (1959).

Mix et al.: Z. Physiol. Chem., vol. 318, pp. 148–158 (1960).

LORRAINE A. WEINBERGER, Primary Examiner

ALBERT P. HALLUIN, Assistant Examiner

U.S. Cl. X.R.

260—518